Nov. 12, 1935.   A. BIKKERS   2,020,763
REFRIGERATING APPARATUS
Filed May 9, 1934
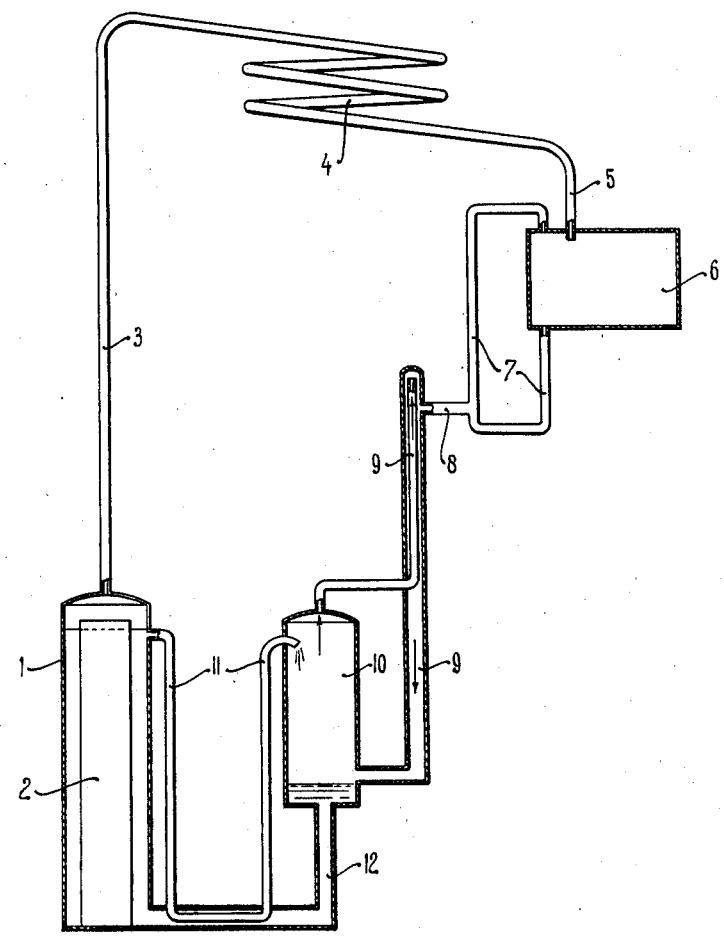
A. Bikkers
INVENTOR Patented Nov. 12, 1935

2,020,763

UNITED STATES PATENT OFFICE 2,020,763

REFRIGERATING APPARATUS

Alexander Bikkers, Scheveningen, Netherlands, assignor to N. V. Naamlooze Vennootschap Athano, Scheveningen, Netherlands, a company of the Netherlands Application May 9, 1934, Serial No. 724,812
In Belgium May 11, 1933

3 Claims. (Cl. 62—119.5)

This invention relates to refrigeration apparatus of the general type in which the refrigerant, for instance ammonia, in various states of aggregation performs a cycle through a gas expeller or boiler, a condenser, an evaporator and an absorber, and in the evaporator mixes with an inert gas, for instance hydrogen, which chiefly serves for maintaining a substantially uniform absolute pressure throughout the apparatus.

In order to promote the flow of refrigerant vapour from the evaporator to the absorber, it has already been suggested to allow the mixture of vapour and inert gas to circulate from the evaporator to the absorber and thence back to the evaporator, but this has the disadvantage that a comparatively great amount of absorption heat is transmitted to the evaporator.

In order to avoid or reduce transmission of heat from the absorber to the evaporator, it has been proposed to provide the absorber with a circulatory pipe outside the evaporator, and to connect said pipe directly with the evaporator, so that the refrigerant vapour produced in the latter diffuses into the inert gas in the evaporator and the circulatory pipe. With this construction, however, the flow of refrigerant vapour to the absorber is very slow, which unfavourably affects the efficiency of the apparatus.

My present invention has for its object a construction, in which the refrigerant vapour is adapted to be readily withdrawn from the evaporator, without, however, any circulation taking place from evaporator to absorber and vice versa. With this object in view, the evaporator is provided with a circulatory pipe outside the absorber. It is preferred to also provide the absorber with a circulatory pipe outside the evaporator, and to suitably connect both said pipes. Seeing that the partial vapour pressure of the refrigerant circulating through the evaporator exceeds that of the refrigerant circulating through the absorber, the vapour will diffuse, through the connecting conduit, in the direction from evaporator to absorber, so that no heat can be transmitted by gas circulating through both vessels in series. Moreover, heat transmission by conduction through the walls of the connecting pipe may be reduced to a minimum by allowing the one branch of the circulatory pipe of the absorber to exchange its heat against that of the other branch so as to prevent comparatively high temperatures from setting up near the place where the connecting pipe opens into the circulatory pipe of the absorber.

It is not immaterial, as far as the heat transmission is concerned, where the circulatory pipes of absorber and evaporator communicate with one another. The best results are obtained when both pipes are connected in points that are situated at relatively great distances from their inlet and outlet openings. It is not desirable for the connecting pipe to open directly into the absorber and/or the evaporator, which vessels, as will be understood, are to be considered as forming parts of the circulatory pipes.

The flow of vapour and gas through the circulatory pipes is preferably brought about by thermosiphon action, but it could obviously also be produced by a fan or any other suitable means.

In order that my said invention may be clearly understood, reference is had to the annexed diagrammatic drawing, which shows a refrigerating apparatus embodying the above features.

Provided within the boiler 1 is a tube 2 adapted to be heated by an electric heating element or other suitable means not shown. At its top, the boiler is connected, through a pipe 3, with the condenser 4, which communicates, through a pipe 5, with the evaporator 6. The latter is fitted with a circulatory pipe 7, the central portion of which is connected, through a pipe 8, with the central portion of a second circulatory pipe 9, with which the absorber 10 is provided. As shown, the branches of pipe 9 form a heat exchanger. Near its top, the boiler is in communication, through a tube 11, with the upper end of the absorber 10, the lower ends of both said vessels being connected by a tube 12, which, as shown, encloses part of tube 11.

Assuming the boiler 1 and the absorber 10 to be partly filled with a strong, aqueous solution of ammonia, the remaining space to be filled with hydrogen of say 18 atm., and tube 2 to be heated, the modus operandi will be as follows:

The liquor in boiler 1 is heated to say 120° C., so that gaseous ammonia is expelled and flows through pipe 3 to condenser 4, where it is cooled by suitable means and thereby liquefied. The liquid ammonia flows into the evaporator 6, where it evaporates so as to create a predetermined partial ammonia vapour pressure of say 2 atm.

Owing to the rapid expansion of said vapour, the temperature within the evaporator is materially reduced, so that the cold mixture of ammonia vapour and hydrogen is caused, by thermosiphon action, to circulate through the by-pass 7 and the vapours produced in the evaporator 6 are immediately withdrawn therefrom.

Owing to the ebullition in vessel 1, the liquor level therein is raised, so that the impoverished solution flows over through pipe 11 into absorber 10. Here, the liquor again absorbs the ammonia present therein, and said rich liquor returns to the boiler through pipe 12. The absorption of ammonia in vessel 10 is promoted by the presence of pipe 9, as the heat liberated in the upper portion of the absorber causes a strong circulation through said pipe and, consequently, an upward flow through the absorber.

Since the absorption of ammonia in vessel 10 reduces the partial ammonia vapour pressure in pipe 9, ammonia must necessarily pass from pipe 7 to pipe 9, and as the hydrogen pressures in both pipes are equal, the ammonia diffuses through the connecting pipe 8, without hydrogen flowing from the absorber to the evaporator. Consequently, any transmission of heat from absorber to evaporator will take place by conduction through the walls of pipe 8, and seeing that the uptake and the downtake of conduit 9 together form a heat exchanger, the place where pipe 8 opens into pipe 9 remains relatively cool and the heat transmission is still further reduced.

What I claim is:—

1. In an absorption refrigerating apparatus of the type wherein the refrigerant vapour in the evaporator is allowed to mix with an inert gas, a circulatory pipe connected to the evaporator and arranged outside the absorber and forming in itself a complete path from and back to the evaporator the connection between the absorber and the evaporator being through a portion of said circulatory pipe.

2. A refrigerating apparatus in accordance with claim 1, in which the absorber is provided with a circulatory pipe outside the evaporator and forming in itself a complete path from and back to the absorber, both circulatory pipes communicating in points remote from the inlet and outlet openings thereof.

3. A refrigerating apparatus in accordance with claim 1, in which the absorber is provided with a circulatory pipe outside the evaporator and forming in itself a complete path from and back to the absorber, both circulatory pipes communicating in points remote from the inlet and outlet openings thereof, and both branches of the circulatory pipe of the absorber being in heat exchanging relation with one another.

ALEXANDER BIKKERS.